Nov. 12, 1957     F. S. EDINGER     2,812,956
CONVERTIBLE TRAILER HITCH
Filed April 29, 1955
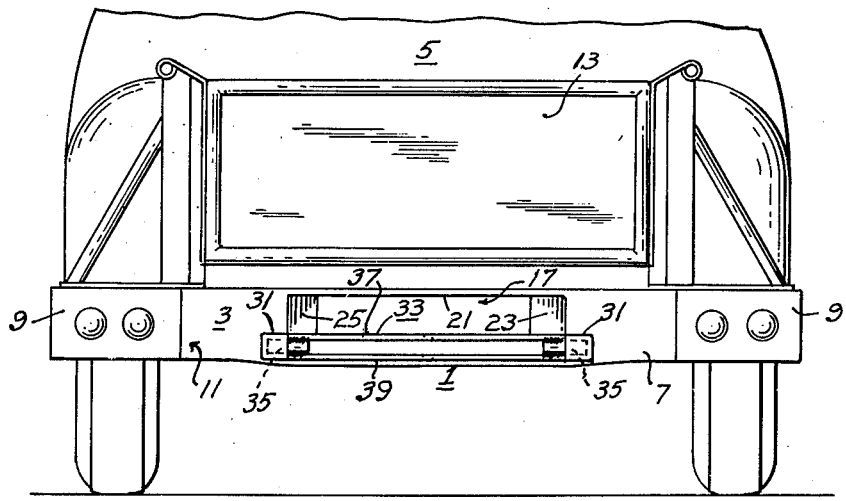
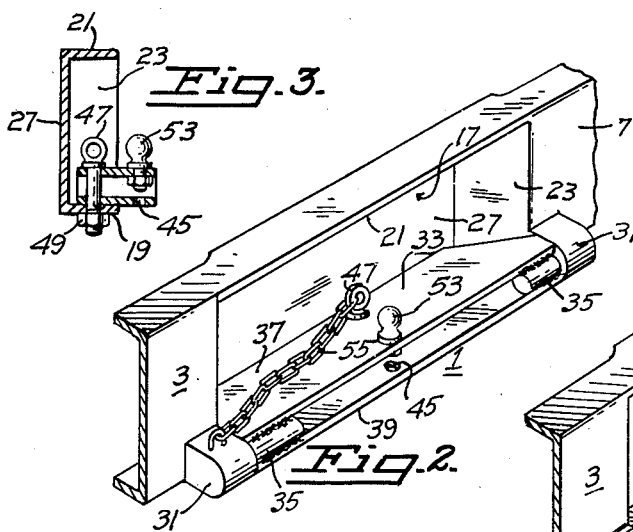
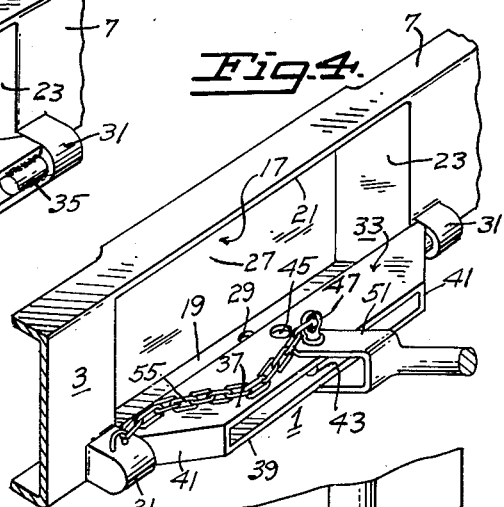
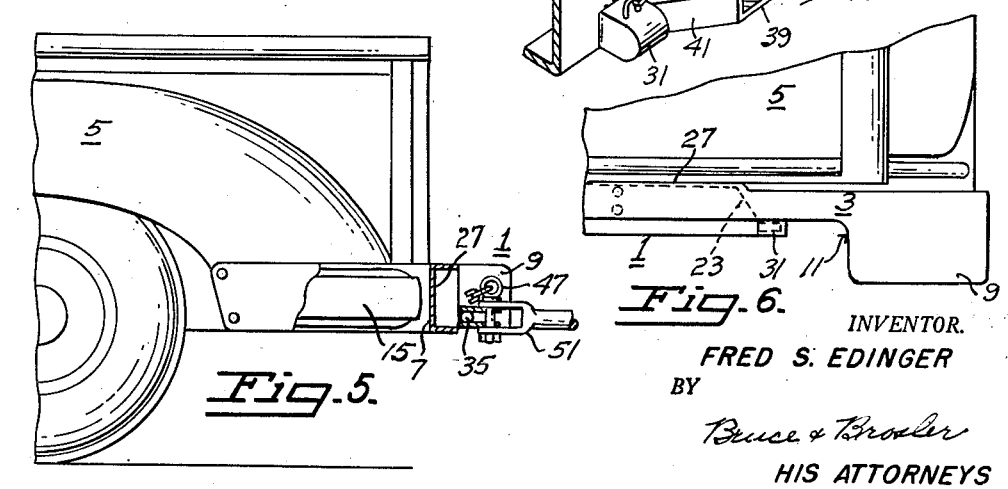
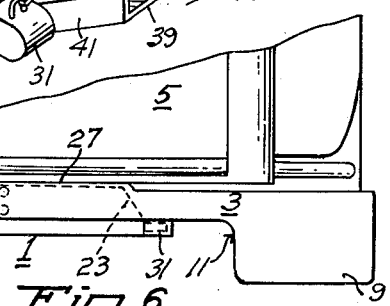
INVENTOR.
FRED S. EDINGER
BY
Bruce & Brosler
HIS ATTORNEYS

United States Patent Office 2,812,956
Patented Nov. 12, 1957

2,812,956

CONVERTIBLE TRAILER HITCH

Fred S. Edinger, Nevada City, Calif.

Application April 29, 1955, Serial No. 504,904

5 Claims. (Cl. 280—491)

My invention relates to bumpers and more particularly to bumpers with included trailer hitches.

Trailer hitches are usually mounted on a vehicle bumper, and may be of the ball type or clevis type. Whether one requires one type or the other depends on the coupling with which the trailer to be hauled, is provided. If the bumper be provided with a clevis type hitch and the trailer with a ball hitch coupling, then one or the other will have to be changed to effect compatibility. And likewise if the reverse situation existed.

Among the objects of the present invention are:

(1) To provide a novel and improved trailer hitch in a bumper;

(2) To provide a novel and improved trailer hitch in a bumper, which can be converted at will from a clevis to a ball hitch and vice versa;

(3) To provide a novel and improved trailer hitch in a bumper, which can be utilized as a fixed clevis hitch or converted to a swivel clevis hitch and vice versa;

(4) To provide a novel and improved trailer hitch in a bumper, which can be converted for use as a fixed clevis, swivel clevis or ball hitch;

(5) To provide a novel and improved trailer hitch in a droppable tail gate bumper;

(6) To provide a novel and improved trailer hitch in a droppable tail gate bumper, which may be converted from one type of hitch to another;

(7) To provide a novel and improved convertible trailer hitch in a droppable tail gate bumper, which will not interfere with the mounting of a spare tire in the conventional space beneath a truck body.

Additional objects of my invention will be brought out in the following description of a preferred embodiment of the same, taken in conjunction with the accompanying drawings, wherein;

Figure 1 is a view in elevation of the rear end of a truck of the pickup type, having a droppable tail gate bumper with the convertible trailer hitch of the present invention incorporated therein;

Figure 2 is a three dimensional view of the convertible hitch of the present invention in condition for use as a ball hitch;

Figure 3 is a view in section taken in the plane 3—3 of Figure 2;

Figure 4 is a three dimensional view similar to that of Figure 2 but depicting the hitch in condition for use as a swivel clevis hitch;

Figure 5 is a side view of the rear corner of the truck of Figure 1, partly broken away to show the relationship of the bumper and the hitch of the present invention and the mounting of a spare tire beneath the truck body;

Figure 6 is a plan view of a rear corner of the truck of Figure 1, depicting the convertible hitch in the droppable tail gate bumper.

Referring to the drawings for details of my invention in its preferred form, the trailer hitch 1 is illustrated as incorporated in a bumper 3 of the droppable tail gate type mounted on the rear of a truck 5.

A bumper of this type involves a cross beam 7 preferably of channel section, having end guards 9 extending rearwardly therefrom to provide a space 11 within which to receive the tail gate 13 of the truck in its downwardly hanging position.

Beneath the body of a truck of this type, there is often provided means for supporting a spare tire 15. However, the location and space available for such spare tire is quite limited, in fact to such extent, that should the bumper necessitate structure extending but a few inches beneath the body of the truck, the spare tire can no longer be carried beneath the body of the truck, but must be supported on a mounting carried on the side of the truck.

Consequently, in constructing the hitch of the present invention and incorporating it into a bumper of the droppable tail gate type, one of the problems is to so incorporate the hitch into the bumper structure as to preclude interference with the supporting of a spare tire beneath the body of the vehicle in the conventional manner.

With this in mind, the cross beam is provided with a built in recess 17 centrally thereof and limited in depth to substantially the overall thickness of the cross beam, so as not to protrude or extend toward the spare tire therein. Such recess may be defined by a floor 19, a roof 21 and end walls 23, 25, preferably angled toward each other, and a wall 27 preferably closing the small end of the recess, facing the truck to which the bumper is attached. Centrally of the floor, adjacent the wall 27 is a hole 29.

To the face of the cross beam adjacent each lower corner of the recess, a bearing 31 is attached to rotatably or hingedly support a hitch plate 33.

Such hitch plate is of a size and shape adapted to fit within the recess 17 and parallel to the floor thereof. At opposing corners thereof it is fitted with journals 35 adapted to be rotatably received within the bearings, to permit the hitch plate to be rotated from a position within the recess to a position lying outside of said recess.

While the hitch plate may be of single solid plate material, I prefer to fabricate the same of two plates 37, 39 of thinner plate material, maintained in spaced relationship by edge walls 41 welded thereto.

The hitch plate contains a pair of holes 43, 45, midway between the end walls 23, 25 with one hole 45 approximately on the hinge axis and the other hole 43 in alignment with the floor hole 29 when the hitch plate is in its inside position.

The hitch as thus described is selectively capable of use in three different ways. With the hitch plate in its inward position, it can be locked by a threaded pin 47 passing through the aligned holes and secured by a nut 49. When so locked, the hitch plate is adapted to receive either, a similar pin in the hole 45 to define a conventional clevis hitch for coupling to the plate, a clevis 51, or a ball pin 53 to form a ball hitch.

In the outward position of the hitch plate, the hitch plate is free to hinge on its journals, and through the use of a clevis pin 47 in the hole 43, the hitch can be converted to a swivel clevis type.

As a matter of expediency, a clevis pin may be connected by a chain 55 to one of the bearing housings 31, and this pin may also be employed to lock the hitch plate in its inward position.

It will be apparent from the foregoing, that my improved trailer hitch may be converted from one type to another, whereby the same may be utilized either as a fixed clevis hitch, a swivel clevis hitch, or a ball hitch, and that the same occupies so little space in depth, as to permit the same to be incorporated into a droppable tail gate type of bumper without interfering with either the maintenance of a spare tire beneath the truck body or the dropping of the tail gate of the truck to a hanging position within the space provided therefor by the bumper.

While I have disclosed my invention in its preferred form, and as installed in a bumper of the droppable tail gate type, the improved hitch of the present invention is subject to alteration and modification without departing from the underlying principles involved; and regardless of the form it takes, the same may be incorporated into bumpers of types other than the droppable tail gate type in which it was illustrated and described in the present application by reason of the additional problems involved in connection with such type of bumper. I therefore do not desire to be limited in my protection to the specific details illustrated and described except as may be necessitated by the appended claims.

I claim:

1. A bumper and hitch assembly comprising a cross-beam having a recess therein centrally of said beam, and a hitch plate of a size adapted to fit within said recess, and hinge means having a substantially horizontal pivot axis hingedly securing said hitch plate to said beam with the hinge axis adjacent an edge of said hitch plate and an edge of said recess whereby said hitch plate may be swung on its hinge axis, from a position within said recess to a position lying outside of said recess.

2. A bumper and hitch assembly comprising a cross-beam having a recess therein centrally of said beam, a hitch plate of a size adapted to fit within said recess, hinge means having a substantially horizontal pivot axis hingedly securing said hitch plate to said beam with the hinge axis adjacent an edge of said hitch plate and an edge of said recess whereby said hitch plate may be swung on its hinge axis, from a position within said recess to a position lying outside of said recess, and means for locking said hitch plate in its position within said recess.

3. A bumper and hitch assembly comprising a cross-beam having end guards extending rearwardly therefrom to form a droppable tail gate bumper, and a recess therein centrally of said beam, said recess having a floor with a hole therein, a hitch plate of a size adapted to fit within said recess and parallel to the floor thereof, and means hingedly securing said hitch plate to said beam with the hinge axis adjacent an edge of said hitch plate whereby said hitch plate may be swung on its hinge axis, from a position within said recess to a position lying outside of said recess, said hitch plate having a pair of holes therein, with one of said holes approximately on the hinge axis of said plate for reception of a hitch pin, and the other of said holes in alignment with the hole in the recess floor when said hitch plate occupies its position within said recess, for the reception of a locking pin.

4. A bumper and hitch assembly comprising a cross-beam having end guards extending rearwardly therefrom to form a droppable tail gate bumper, and a recess therein centrally of said beam, said recess having a floor with a hole therein, bearings on said beam adjacent the lower corners of said recess, a hitch plate of a size adapted to fit within said recess and parallel to the floor thereof, and means hingedly securing said hitch plate in said bearings with the hinge adjacent an edge of said hitch plate whereby said hitch plate may be swung on its hinge axis, from a position within said recess to a position lying outside of said recess, said hitch plate having a pair of holes therein, with one of said holes approximately on the hinge axis of said plate for reception of a hitch pin, and the other of said holes in alignment with the hole in the recess floor when said hitch plate occupies its position within said recess, for reception of a locking pin.

5. A bumper and hitch assembly comprising a cross-beam having end guards extending rearwardly therefrom to form a droppable tail gate bumper, and a recess therein centrally of and of a depth approximately the thickness of said beam, said recess having a floor with a hole therein, bearings on said beam adjacent the lower corners of said recess, a hitch plate of a size adapted to fit within said recess and parallel to the floor thereof, means hingedly securing said hitch plate in said bearings with the hinge adjacent an edge of said hitch plate whereby said hitch plate may be swung on its hinge axis, from a position within said recess to a position lying outside of said recess, said hitch plate having a pair of holes therein, with one of said holes approximately on the hinge axis of said plate for reception of a hitch pin, and the other of said holes in alignment with the hole in the recess floor when said hitch plate occupies its position within said recess, and means adapted to pass through said aligned holes for locking said hitch plate in its position within said recess.

References Cited in the file of this patent

UNITED STATES PATENTS

| | | |
|---|---|---|
| 2,527,155 | Schlenz | Oct. 24, 1950 |
| 2,666,654 | Gray | Jan. 19, 1954 |
| 2,707,650 | Lawton | May 3, 1955 |